(12) United States Patent
Sakakida et al.

(10) Patent No.: US 8,034,142 B2
(45) Date of Patent: Oct. 11, 2011

(54) GAS/LIQUID SEPARATOR

(75) Inventors: Akihiro Sakakida, Yokosuka (JP); Hiroshi Tanaka, Yokosuka (JP); Junichi Hasegawa, Yokohama (JP); Ken Nakayama, Yokohama (JP); Kazuhiro Kageyama, Yokohama (JP); Satoshi Okano, Yokohama (JP); Takayoshi Nabeta, Yokosuka (JP); Yoshinori Nakano, Yokosuka (JP); Nobuo Sakatsume, Yokosuka (JP); Kotaro Akashi, Yokohama (JP); Hisashi Niioka, Yokohama (JP); Douglas Vanderwees, Ontario (CA); Mark Britton, Ontario (CA); Manaf Hasan, Ontario (CA); Craig Hogg, Ontario (CA)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 223 days.

(21) Appl. No.: 12/294,190

(22) PCT Filed: Mar. 24, 2006

(86) PCT No.: PCT/JP2006/306026
§ 371 (c)(1),
(2), (4) Date: Apr. 15, 2009

(87) PCT Pub. No.: WO2007/110904
PCT Pub. Date: Oct. 4, 2007

(65) Prior Publication Data
US 2009/0205297 A1 Aug. 20, 2009

(51) Int. Cl.
*B04C 3/00* (2006.01)
(52) U.S. Cl. ............ 55/457; 55/456; 55/447; 55/338; 55/339; 55/449; 55/423; 55/445; 55/418; 55/426

(58) Field of Classification Search .............. 55/457, 55/456, 447, 338–339, 449, 423, 445, 418, 55/426
See application file for complete search history.

(56) References Cited

U.S. PATENT DOCUMENTS

| 3,469,566 | A * | 9/1969 | Wilkinson et al. .............. 60/317 |
| 5,024,203 | A | 6/1991 | Hill |
| 5,049,171 | A | 9/1991 | Presnell et al. |
| 5,643,470 | A | 7/1997 | Amini |
| 6,428,915 | B1 | 8/2002 | Ban et al. |
| 6,485,854 | B1 | 11/2002 | Grover et al. |
| 6,541,141 | B1 | 4/2003 | Frank et al. |
| 6,758,343 | B1 | 7/2004 | Soto |
| 2001/0005986 | A1 | 7/2001 | Masubara et al. |
| 2002/0025463 | A1 | 2/2002 | Derflinger et al. |
| 2002/0088347 | A1 | 7/2002 | Kinsel |

(Continued)

FOREIGN PATENT DOCUMENTS
JP 42-006704 3/1967
(Continued)

*Primary Examiner* — Jason M Greene
*Assistant Examiner* — Dung H Bui
(74) *Attorney, Agent, or Firm* — Young Basile

(57) ABSTRACT

A gas/liquid separator is provided in which separation performance for fluid into gas and liquid is enhanced. A gas/liquid separator includes a body which separates a circulation gas into water and hydrogen gas in a separating space, a supply port from which the circulation gas flows into the inner space, the supply port being provided on the side wall surface forming the separating space, and a discharge port through which the separated hydrogen gas flows out of the separating space, the discharge port being provided on the side wall surface. In this case, the discharge port is provided above the supply port.

25 Claims, 13 Drawing Sheets

U.S. PATENT DOCUMENTS

| | | |
|---|---|---|
| 2004/0197240 A1 | 10/2004 | Wheat et al. |
| 2004/0197622 A1 | 10/2004 | Wheat et al. |
| 2005/0053806 A1 | 3/2005 | Mukai et al. |
| 2005/0106442 A1 | 5/2005 | Gottwick et al. |

FOREIGN PATENT DOCUMENTS

| | | |
|---|---|---|
| JP | 44-002306 | 1/1969 |
| JP | 53-10409 | 1/1978 |
| JP | HEI 03-032113 | 3/1991 |
| JP | HEI 05-296611 | 11/1993 |
| JP | HEI 06-142424 | 5/1994 |
| JP | HEI 6-511290 | 12/1994 |
| JP | HEI 10-009723 | 1/1998 |
| JP | HEI 10-311627 | 11/1998 |
| JP | 2003-001033 A | 1/2003 |
| JP | 2003-311185 A | 11/2003 |
| JP | 2004-113886 A | 4/2004 |
| JP | 2005-071926 A | 3/2005 |
| WO | 93/01890 | 2/1993 |

\* cited by examiner

GAS/LIQUID SEPARATOR

TECHNICAL FIELD

The present invention relates to a gas/liquid separator which separates gas (fluid) containing liquid into the gas and the liquid, and particularly, to a gas/liquid separator which separates water contained in the reaction gas of a fuel cell system.

BACKGROUND ART

Heretofore, a fuel cell has been known which supplies fuel gas (for example, hydrogen) to a fuel electrode (anode), and supplies oxidizing gas (for example, air) to an oxidizing electrode (cathode), thereby electrochemically reacting these gases with each other to generate electric power. In this type of fuel cell, discharge gas from the fuel electrode side is circulated to a fuel gas supply side by a circulation pump and the like, and thus reaction efficiency is enhanced.

Incidentally, in this fuel cell water is generated following the reactions of the gases on the fuel electrode and the oxidizing electrode. Generated water is particularly prone to be generated on the oxidizing electrode side. The generated water flows into a circulation system of the fuel gas, since the generated water moves toward the fuel electrode side through an electrolyte membrane. The generated water may cause a malfunction in the circulation means such as the circulation pump. Furthermore, the generated water flows into the fuel cell, and a problem of flooding can occur which will decrease the reacting area of the fuel electrode. Therefore, a gas/liquid separator may be provided in the fuel gas circulation system to separate the circulated gas (the discharge gas from the fuel electrode) into the fuel gas and the water (for example, refer to Patent Literature 1).

Patent Literature 1: Japanese Patent Laid-Open Publication No. 2003-311185

DISCLOSURE OF THE INVENTION

Problems to be Solved by the Invention

By the way, the gas/liquid separator disclosed in Patent Document 1 supplies the circulated gas to a separating space formed inside of a body, thereby generating a swirl flow in the separating space by the circulated gas, thus separating the circulated gas into the fuel gas and the water by centrifugal force. In this case, the circulated gas is supplied from an upper portion of the body, and the fuel gas from which the water is separated in the separating space is discharged from a lower portion of the body. Accordingly, the direction where the fuel gas is discharged and the direction where the separated water falls become the same. As a result, the water becomes contained in the fuel gas again. Such a case is an example. The circulated gas supplied to the separating space is separated into the fuel gas and the water by centrifugal force. When the separated fuel gas is discharged from the separating space to the outside, the fuel gas must be discharged in a state that is not affected by the presence of separated water in the separating space. As a result, a problem is that sufficient separation performance cannot be obtained.

The present invention has been made in consideration of the circumstances as described above, and an object is to provide a gas/liquid separator in which the separation performance for the gas and the liquid is enhanced.

Means for Solving the Problems

In order to solve such a problem, the present invention provides a gas/liquid separator including a body, a supply port, and a discharge port. Here, within the body, a cylindrical inner space formed by a side wall surface is extended in a vertical direction, and fluid supplied into this inner space is caused to swirl along the side wall surface, and thereby to separate the fluid into liquid and gas. The supply port is an opening provided on the side wall surface, from which the fluid flows into the inner space. The discharge port is an opening provided on the side wall surface, through which the separated gas flows out of the inner space. In this case, the discharge port is provided above the supply port.

Effect of the Invention

According to the present invention, the fluid is flown into the inner space from the supply port provided on the side wall surface, and the gas from which the liquid is separated is flown outside from the discharge port on the side wall surface. This discharge port adopts a configuration such that the gas flowing out of the inner space through the discharge port is not affected by the separated liquid in this space, and thus performance can be enhanced.

EXPLANATION OF REFERENCE NUMERALS AND SIGNS IN THE DRAWINGS

1 FUEL CELL STACK
2 FUEL TANK
3 HYDROGEN PRESSURE REGULATION VALVE
4 HYDROGEN CIRCULATION PUMP
5 COMPRESSOR
6 AIR PRESSURE REGULATION VALVE
10 GAS/LIQUID SEPARATOR
20 TOP PLATE
21 SWIRL CENTER
30 WATER RESERVOIR
33 WATER DISCHARGE PASSAGE
34 INNER PASSAGE
35 SEALING PORTION
36 SPLASH PREVENTION PLATE
40 BODY
43 SIDE WALL SURFACE
44 GROOVE
45 SUPPLY PORT
46 GROOVE
47 INNER PASSAGE
48 DISCHARGE PORT
49 GUIDE PORTION
50 SCUPPER RING
51 SCUPPER PLATE
52 PROJECTION
53 HOLLOW MEMBER
54 CASKET
55 WATER SHIELDING PLATE
56 PLATE-LIKE MEMBER
57 WIND DIRECTING PLATE
58 SCUPPER PLATE
59 PLATE-LIKE MEMBER

BEST MODE FOR CARRYING OUT THE INVENTION

First Embodiment

A description will be made below of a gas/liquid separator according to a first embodiment of the present invention. For example, this gas/liquid separator is suitable as a gas/liquid separator for use in a fuel cell system, particularly for deployment in a vehicle. Here, prior to a description of a specific configuration of the gas/liquid separator, a description will be briefly made of a basic configuration of the fuel cell system.

Figure 1:
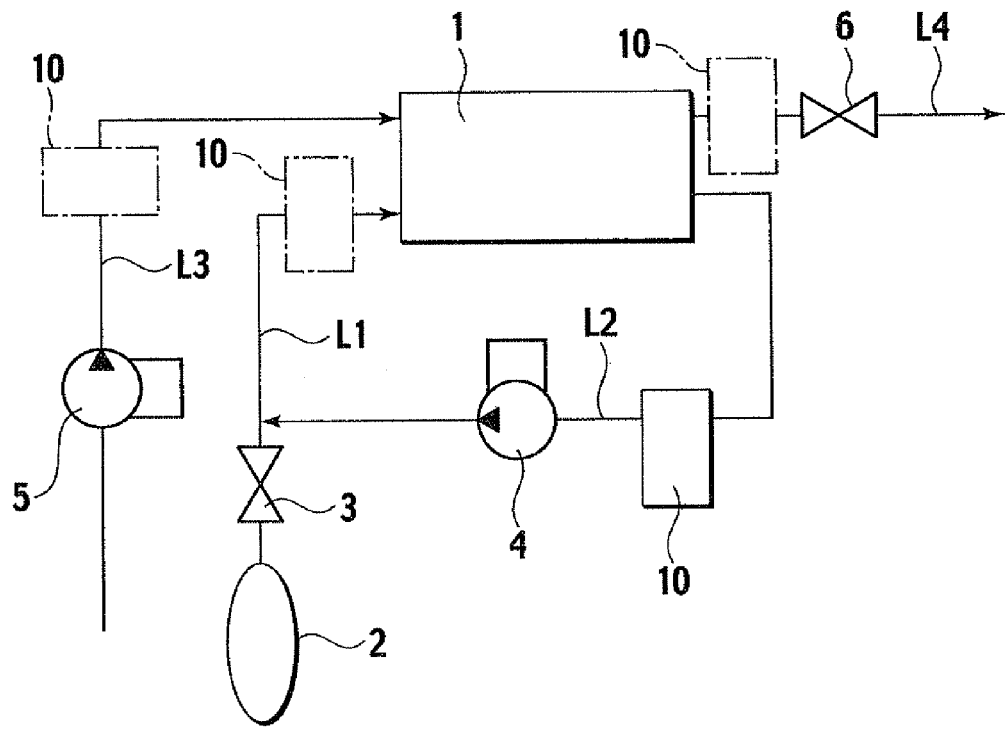
FIG. 1 is a schematic configuration diagram of a fuel cell system.

FIG. 1 is a schematic configuration diagram of the fuel cell system. The fuel cell system is mainly composed of a fuel cell stack 1 which generates electric power by electrochemically reacting fuel gas (for example, hydrogen) and oxidizing gas (for example, air) with each other. A fuel cell structure is formed by providing an oxidizing electrode (cathode) and a fuel electrode (anode) opposite to each other with respect to an electrolyte/electrode catalyst complex and sandwiched by separators, with the fuel cell stack 1 constructed by stacking together a plurality of such fuel cell structures. This fuel cell system includes a hydrogen system for supplying the hydrogen to the fuel cell stack 1, and an air system for supplying the air to the fuel cell stack 1.

In the hydrogen system, the hydrogen as the fuel gas is supplied from a stored state thereof in a fuel tank 2 such as a high-pressure hydrogen tank to the fuel cell stack 1 through a hydrogen supply passage L1. In the hydrogen supply passage L1, a hydrogen pressure regulation valve 3 is provided, and an opening thereof is controlled so that a pressure of the hydrogen supplied to the fuel cell stack 1 can be set at a desired value. Discharge gas (gas containing unused hydrogen and the like) from the fuel electrodes of the fuel cell stack 1 is discharged to a hydrogen circulation passage L2. As for the hydrogen circulation passage L2, the other end is connected the hydrogen supply passage L1 on an upstream side of the fuel cell stack 1. In the hydrogen circulation passage L2, a hydrogen circulation means (for example, a hydrogen circulation pump 4) is provided. By driving the hydrogen circulation pump 4, the discharge gas from the fuel electrode side of the fuel cell stack 1 is circulated to a hydrogen supply side of the fuel electrodes of the fuel cell stack 1. Thus, reaction efficiency in the fuel cell stack 1 can be enhanced.

In the air system, for example, the air as the oxidizing gas is pressurized above atmospheric pressure by a compressor 5 and is supplied to the fuel cell stack 1 through an air supply passage L3. In this air supply passage L3, a humidifier (not shown) is provided, and the air supplied to the fuel cell stack 1 is humidified to an extent where power generation performance of the fuel cell stack 1 is not reduced. The discharge gas from the fuel cell stack 1 is discharged to the outside (atmosphere) through an air discharge passage L4. In this air discharge passage L4, an air pressure regulation valve 6 is provided. The air pressure regulation valve 6 is controlled an opening thereof together with a drive amount (the number of revolutions) of the compressor 5 so that a pressure and flow rate of the air supplied to the fuel cell stack 1 can be set at desired values.

On the fuel electrode side of each fuel cell constituting the fuel cell stack 1, a reaction in which the hydrogen is converted into a hydrogen ion (proton) and an electron is performed. This hydrogen ion moves to the oxidizing electrode side through an electrolyte membrane, and a reaction in which water is generated from oxygen, the hydrogen ion, and the electron is performed on the oxidizing electrode side. While the water generated in the oxidizing electrode side is discharged to the air discharge passage L4 together with the air discharged from the oxidizing electrode, the water moves to the fuel electrode side through the electrolyte membrane. The generated water, which has moved to the fuel electrode side, is discharged to the hydrogen circulation passage L2 together with the discharge gas discharged from the fuel electrode. In the case where the generated water flows into the hydrogen circulation pump 4, an operational malfunction will be caused. In the case where the generated water flows into the fuel cell, a decrease in the reacting area of the fuel electrode will be caused. Accordingly, in the hydrogen circulation passage L2, for example, on an upstream side of the hydrogen circulation pump 4, a gas/liquid separator 10 which separates the water contained in the discharge gas, and supplies the hydrogen gas to a downstream side thereof is provided.

Figure 2:
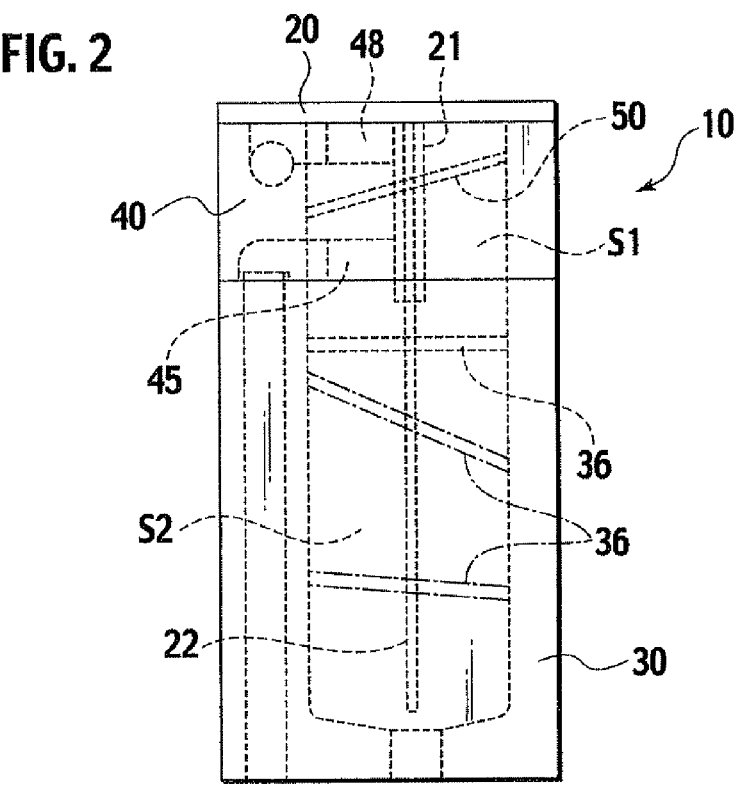
FIG. 2 is a schematic configuration view showing a gas/liquid separator 10 according to a first embodiment of the present invention.

FIG. 2 is a schematic configuration view showing the gas/liquid separator 10. The gas/liquid separator 10 is mainly composed of a top plate 20, a water reservoir (reservoir) 30 and a body 40, and has a form in which the body 40 is disposed between the top plate 20 and the water reservoir 30. This gas/liquid separator 10 has an integral structure in which these members are assembled with one another, and is disposed in the hydrogen circulation passage L2 in a state where the top plate 20 is located up in the vertical direction and the water reservoir 30 is located down in the vertical direction. Note that, though the top plate 20, the body 40, and the water reservoir 30 are individually composed as independent members of one another in this embodiment, such various members may be integrally composed, for example, as in a pair of the top plate 20 and the body 40 or in a pair of the body 40 and the water reservoir 30 as long as individual functions thereof to be described later can be exerted.

The gas/liquid separator 10 contains a series of space including a separating space S1 as an inner region of the body 40, and a water reservoir space S2 as an inner region of the water reservoir 30. Circulated gas (discharge gas which contains the mist water and the hydrogen from the fuel electrode side of the fuel cell stack) which flows in the hydrogen circulation passage L2 is captured into the separating space S1 of the gas/liquid separator 10, and in the separating space S1, the circulated gas (fluid) is separated into the hydrogen gas (gas) and the water (liquid). The separated hydrogen gas is discharged from the separating space S1 to the hydrogen circulation passage L2, and meanwhile, the separated water (hereinafter called a separated water) is stored in the water reservoir space S2. Here, though the circulated gas which flows in the hydrogen circulation passage L2 contains a gas component other than the hydrogen gas, for example, nitrogen gas and the like, for the sake of convenience, it is assumed in this specification that only the hydrogen gas is contained in the gas component of the circulated gas.

The top plate 20 is a plate-like member, and hermetically seals the separating space S1 by being attached onto an upper surface side of the body 40. Moreover, a ring-like packing (not shown) is provided on between the attached surfaces of the top plate 20 and the body 40, and a contrivance to enhance sealing property between the top plate 20 and the body 40 is made.

Figure 3:
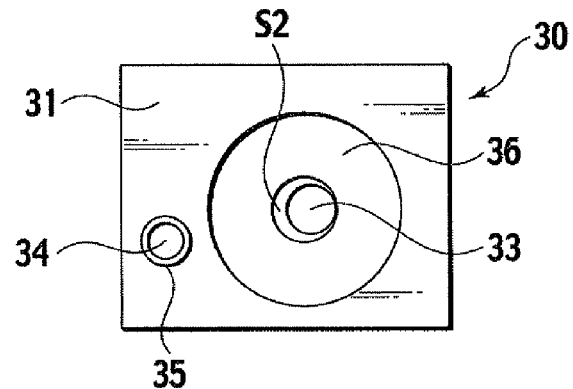
FIG. 3 is a top view of a water reservoir 30.
Figure 4:
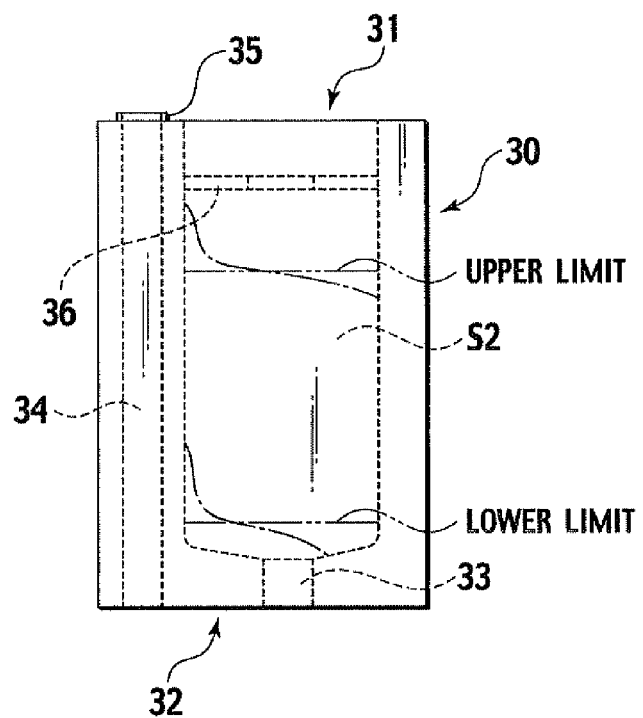
FIG. 4 is an elevation view of the water reservoir 30.
Figure 5:
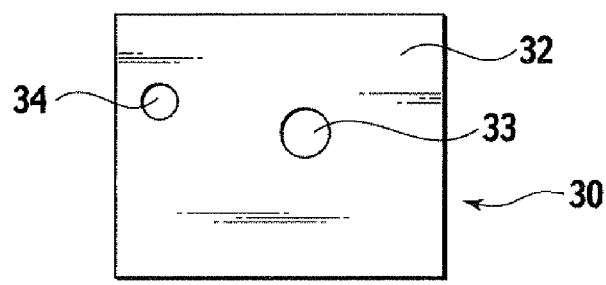
FIG. 5 is a bottom view of the water reservoir 30.

FIG. 3 is a top view of the water reservoir 30, FIG. 4 is an elevation view of the water reservoir 30, and FIG. 5 is a bottom view of the water reservoir 30. The water reservoir 30 includes a cylindrical inner space (the water reservoir space S2) extended in the vertical direction, and is in charge of storing the water, which is separated in the separating space S1 of the body 40, and stored in the water reservoir space S2. This water reservoir 30 has a shape in which an upper surface 31 side is opened, and the water reservoir space S2 communicates with the separating space S1 of the body 40 by being attached onto a lower surface side of the body 40. Meanwhile, on a lower surface 32 side of the water reservoir 30, a water discharge passage 33 which connects an external pipe (not shown) and the water reservoir space S2 to each other is formed. On the external pipe, an open/close valve (not shown) is provided, and by opening the open/close valve according to needs, the separated water accumulated in the water reservoir space S2 is discharged to the outside through the water discharge passage 33 and the external pipe. Preferably, the level of the separated water accumulated in the water reservoir space S2 is set an upper limit level storing the water possibility in a degree of level such that hereinafter the splash prevention plate 36 is not flooded, and set an lower limit level discharging the water possibility in a degree of level such that the circulated gas is not discharged from the water discharge passage 33, as shown in the dash line of FIG. 4, in consideration of a range of level fluctuation induced by rocking (for example, for deployment vehicle).

In the water reservoir 30, an inner passage 34, which penetrates between the upper surface 31 and the lower surface 32 in the vertical direction, is formed. The hydrogen circulation passage L2 is connectable to an end of the inner passage 34, which opens to the lower surface 32 side. Accordingly, the circulated gas which flows in the hydrogen circulation passage L2 flows in the inside of the water reservoir 30 from the downward to the upward in the vertical direction through the inner passage 34, and is supplied to the body 40. Moreover, on an end of the inner passage 34, which opens to the upper surface 31 side, a sealing portion 35 formed by projecting a circumference of an opening into a ring shape is formed. This sealing portion 35 is in charge of sealing a gap between the water reservoir 30 and the body 40 so as to prevent the water contained in the circulated gas from leaking out of the gap therebetween in the case of supplying the circulated gas to the body 40 side through the inner passage 34.

Figure 6:
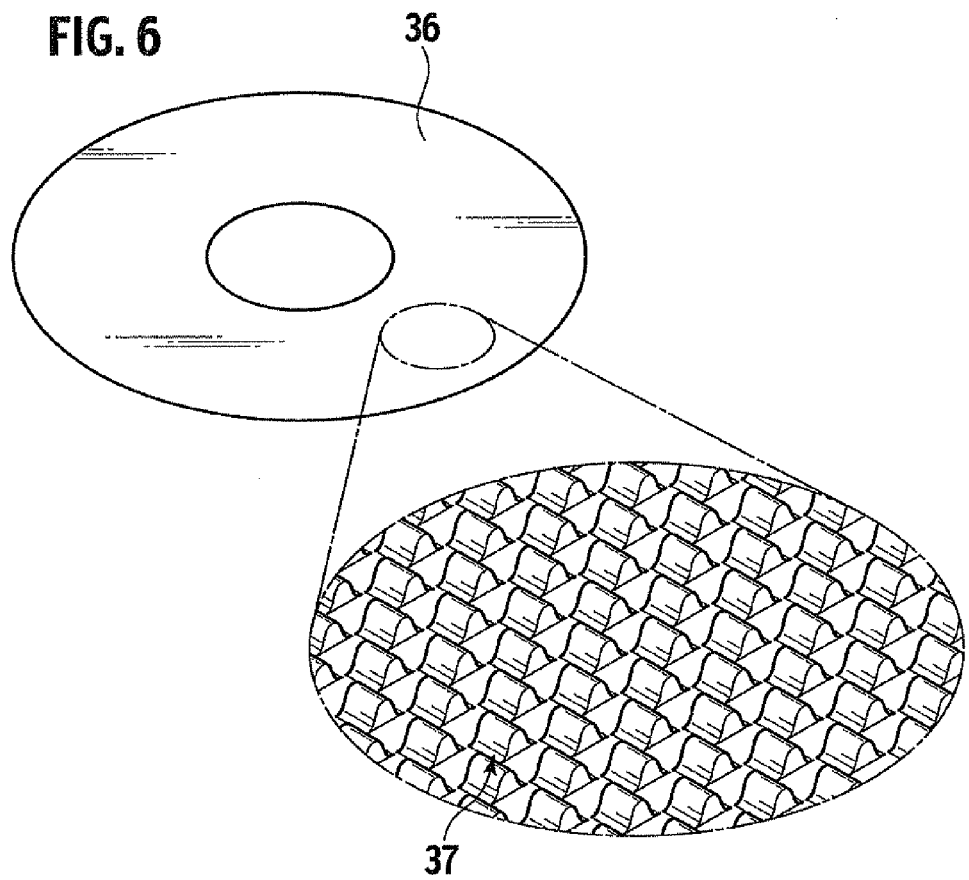
FIG. 6 is an explanatory view of a splash prevention plate 36.
Figure 7:
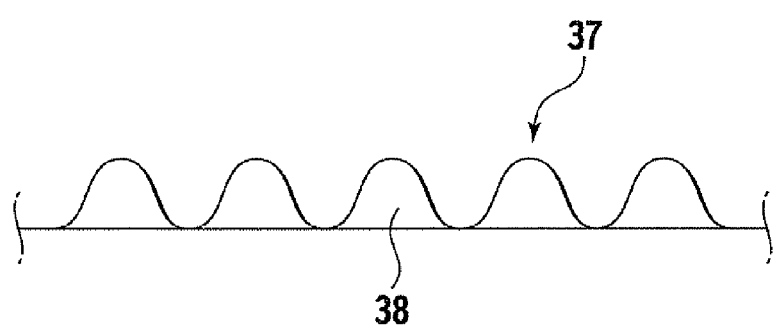
FIG. 7 is an enlarged side view of the splash prevention plate 36.

FIG. 6 is an explanatory view of a splash prevention plate 36, and FIG. 7 is an enlarged side view of the splash prevention plate 36. The splash prevention plate 36 is a plate-like member in which an opening is formed on the center, and is attached into the water reservoir 30 in a form of being inner contact with the water reservoir space S2 of the water reservoir 30. Splashing of the water accumulated in the water reservoir space S2 may be caused by application of vibrations and the like to the water reservoir 30. The splash prevention plate 36 is in charge of regulating the splashed water from flowing into the separating space S1 of the body 40, and is preferably positioned at a location generally more upward than the upper limit level, as shown in FIG. 4. As shown in FIGS. 6 and 7, the splash prevention plate 36 is composed of a plurality of linear wavy portions 37 in which the plate material is projected intermittently by being cut and raised upward and which are arrayed adjacent to one another. In this case, the wavy portions 37 adjacent to each other are arrayed in a form in which individual cut and raised positions are offset relative to each other. In these wavy portions 37, gaps created in the portions of the plate where the material is cut and raised function as scupper holes 38 for the separated water. Owing to the shape of the scupper holes 38, the scupper holes 38 inhibit an upward flow of the water therefrom as a boundary though permit a downward flow of the water therefrom. Thus, the separated water can be restricted from flowing into the separating space S1 from the water reservoir space S2 without inhibiting the water separated in the separating space S1 from flowing into the water reservoir space S2. As a result, separation performance for the water contained in the circulated gas can be enhanced. In addition, as shown by the dash lines of FIG. 2, the splash prevention plate 36 can be provided in the water reservoir space S2 with various kinds of forms. For example, the splash prevention plate 36 may be preferably provided in the neighborhood of the joint of the body 40 and the water reservoir 30, in an orientation that is inclined at an opposite angle to that of a scupper ring 50 described below. Moreover, the splash prevention plate 36 can be adapted to a porous body or a mesh-like member, but the splash prevention plate 36 can effectively restrict an inflow of the separated water by adopting the structure stated above. Moreover, the splash prevention plate 36 can have a shape in which the opening is not formed on the center, although if the opening is formed on the center thereof, discharge performance can be enhanced.

Figure 8:
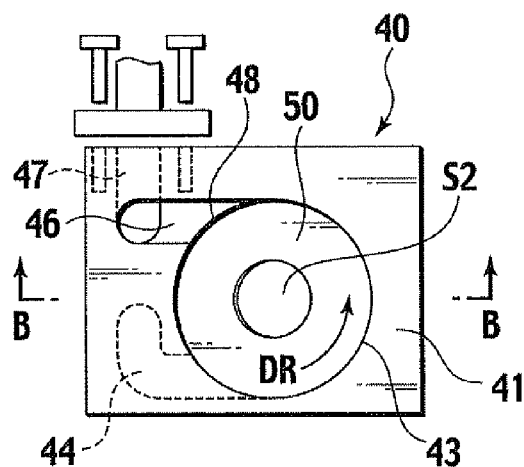
FIG. 8 is a top view of a body 40.
Figure 9:
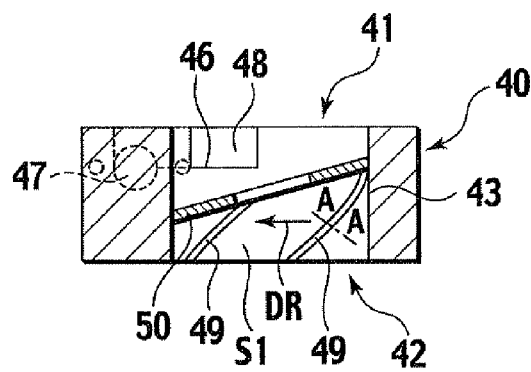
FIG. 9 is a B-B cross-sectional view of the body 40 shown in FIG. 8.
Figure 10:
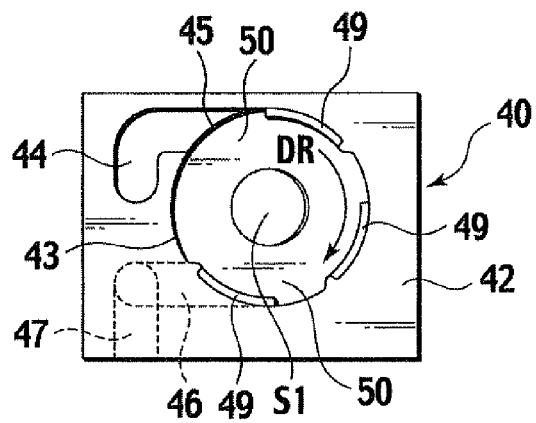
FIG. 10 is a bottom view of the body 40.

FIG. 8 is a top view of the body 40, FIG. 9 is a cross-sectional view of the body 40 shown in FIG. 8 along a line B-B, and FIG. 10 is a bottom view of the body 40. The body 40 has a shape comprising an upper surface 41 side and a lower surface 42 side, that are opened to a cylindrical inner space (separating space S1) formed by a side wall surface 43 that is extended in the vertical direction. This separating space S1 functions as a separating chamber in such a manner that the circulated gas supplied into the separating space S1 itself swirls along the side wall surface 43, such that the swirling motion separates the circulated gas into the hydrogen gas and the water.

On the lower surface 42 of the body 40, which is an attached surface onto the water reservoir 30 side, a groove 44 dented into a concave shape is formed. When the water reservoir 30 is attached onto the body 40, this groove 44 functions as a passage which guides, to the separating space S1, the circulated gas supplied from the inner passage 34 of the water reservoir 30. By forming the groove 44 as described above, a supply port 45 from which the circulated gas flows into the separating space S1 is formed on the lower surface 42 side of the side wall surface 43. Moreover, in this embodiment, the groove 44 is formed to be extended in a tangential direction to the side wall surface 43 so that the circulated gas which flows from the supply port 45 can enter into the separating space S1 along the side wall surface 43. Moreover, the groove 44 is formed into a shape bent into an approximately L character on the lower surface 42 of the body 40.

Meanwhile, also on the upper surface 41 of the body 40, which is an attached surface onto the top plate 20 side, a groove 46 dented into a concave shape is formed. When the top plate 10 is attached onto the body 40, this groove 46 functions as a passage which discharges the hydrogen gas separated in the separating space S1 to the outside through the inner passage 47 in the inside of the body 40. By providing the groove 46 as described above, a discharge port 48 from which the hydrogen gas separated in the separating space S1 flows out is formed on the upper surface 41 side of the side wall surface 43. Moreover, in this embodiment, the groove 46 is made to be extended in the tangential direction of the side wall surface 43 so that the hydrogen gas which swirls in the separating space S1 can smoothly flow into the discharge port 48. The inner passage 47 connected to this groove 46 has a passage shape which first goes down in the vertical direction, then bends in the horizontal direction, and penetrates through to the outside surface of the body 40. Then, a downstream side of the hydrogen circulation passage L2 is connectable to an end of the inner passage 47, which is open to the side surface of the body 40. In addition, the passage shape of the inner passage 47 is not limited to this embodiment. But, as shown in FIG. 8, the passage shape exerts an effect that a connection port connecting between the body 40 and a plumbing for discharging the circulation gas from the body 40 can be easily formed, such that going down in the vertical direction like this embodiment.

In the separating space S1 of the body 40, a scupper ring 50 is provided between the discharge port 48 and the supply port 45. This scupper ring 50 is composed of a plate-like member in which an opening is formed in a center region, and is brought into inner contact with the side wall surface 43 which forms the separating space S1. The scupper ring 50 reduces an inner diameter of the separating space S1 in response to the opening formed in itself, and thereby restricts the water splashed at the supply port 45 from entering into the upper side when the circulated gas flows into the separating space S1 from the supply port 45, and thus, the scupper ring 50 exerts an effect of enhancing the separation performance for the water. Particularly in this embodiment, the scupper ring 50 is brought into inner contact with the side wall surface 43 in a form of being inclined to the supply port 45. By this inclined form, an area of the scupper ring 50, which restricts the water splashed at the supply port 45, becomes the maximum, and the separation performance can be further enhanced. In addition, the area of the opening provided in the center of the scupper ring 50 can be adjusted in consideration of the pressure drop and the amount of splash water. For example, the area of the opening provided in the center of the scupper ring 50 can be larger than the opening provided in the center of the splash prevention plate 36.

In this body 40, when the circulated gas supplied from the inner passage 34 of the water reservoir 30 flows into the separating space S1 from the supply port 45 through the groove 44 on the lower surface 42 side of the body 40, the circulated gas swirls in the inside of the separating space S1 along the side wall surface 43. In this separating space S1, centrifugal force which follows a swirl flow acts, and accordingly, the water which has a heavy specific gravity is guided to the side wall surface 43. In this way the hydrogen gas and the water are separated from each other. The circulated gas (hydrogen gas) from which the water is separated by this separating function is discharged from the discharge port 48 to the hydrogen circulation passage L2 through the groove 46 on the upper surface 41 side of the body 40 and the inner passage 47 thereof.

Incidentally, the separated water adheres onto the side wall surface 43 by the centrifugal force, and falls to the water reservoir 30 side by its own weight as the water coalesce. Since the separated water is affected by the swirl flow in the separating space S1, there is a possibility that the separated water moves from the side wall surface 43 and flows into the discharge port 48. Accordingly, in this embodiment, a guide portion (a liquid guide portion) 49 for guiding the separated water to the water reservoir 30 side is formed in the side wall surface 43 of the body 40 which forms the separating space S1. The guide portion 49 is composed of a convex projection projecting from the side wall surface 43 toward the center direction of the separating space S1, and is extended in a spiral shape over the side wall surface 43 in the vertically downward direction. Over the side wall surface 43 in the vertically downward direction, the spiral direction of this guide portion 49 is inclined to a rotation direction DR in which the circulated gas supplied to the separating space S1 swirls. By providing this guide portion 49, the separated water which moves on the side wall surface 43 along the swirl flow is guided downward (to the water reservoir 30 side) along the spiral projection when the separated water reaches the guide portion 49. Thus, the separated water adhered onto the side wall surface 43 can be guided to the water reservoir 30 effectively. Moreover, in this embodiment, three guide portions 49 are formed at positions different from one another in a circumferential direction of the side wall surface 43. Thus, the separated water can be guided by the individual guide portions 49, and accordingly, the separated water can be guided to the water reservoir 30 more effectively.

Figure 11:
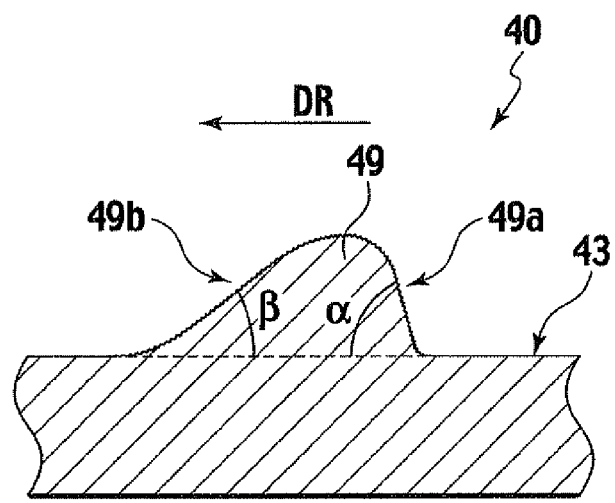
FIG. 11 is an explanatory view explaining a projection shape of a guide portion 49.

FIG. 11 is an explanatory view explaining the projection shape of the guide portions 49. For the purpose of efficiently guiding the separated water downward, a structural contrivance as will be described below is further made for each guide portion 49. First, an erection angle α of a surface (side surface) 49a of the guide portion 49, which corresponds to an upstream side of the swirl flow swirling in the separating space S1, is made acute. Thus, it becomes difficult for the separated water which moves on the side wall surface 43 to get over the projection portions of the guide portion 49, and accordingly, the effect of guiding the separated water can be enhanced. Moreover, an erection angle β of a surface (side surface) 49b of the guide portion 49, which corresponds to a downstream side of the swirl flow, is made gentler than the erection angle α of the surface 49a corresponding to the upstream side thereof. Thus, even if the separated water which moves on the side wall surface 43 gets over the projection portions of the guide portion 49, an amount of the separated water splashed on tips of the projections can be reduced. Moreover, in the guide portion 49, a surface shape of each projection portion thereof is formed into a minutely undulated shape from the upstream side of the swirl flow toward the downstream side thereof. Thus, a moving speed of the separated water on the guide portion 49 can be restricted, and accordingly, it can be made difficult for the separated water to get over the projection portions of the guide portion 49. Thus, the effect of guiding the separated water can be enhanced.

As described above, according to this embodiment, the gas/liquid separator 10 includes the body 40 which separates the circulated gas into the water and the hydrogen gas in the separating space S1 extended in the vertical direction, the supply port 45 from which the circulated gas flows into the separating space S1, the supply port 45 being provided on the side wall surface 43 which forms this separating space S1, and the discharge port 48 through which the separated hydrogen gas flows out of the separating space S1, the discharge port 48 being provided on the side wall surface 43. Here, the discharge port 48 is provided above the supply port 45. Thus, the discharge port 48 adopts a configuration that the hydrogen gas flowing out of the inner space S1 through the discharge port 48 is relatively unaffected by the separated water in this space S1. In particular, the circulated gas that is directed into the separating space S1 is forced to travel upward while swirling along the side wall surface 43. Therefore, the circulated gas goes to a side opposite to that of the falling direction of the separated water, and it becomes difficult for the water to be contained in the hydrogen gas which flows into the discharge port 48, thus making it possible to enhance the separation performance for the circulated gas into the hydrogen gas and the water. Moreover, according to this embodiment, the supply port 45 and the discharge port 48 are individually provided on the side wall surface 43 which forms the separating space S1. Therefore, swirling performance of the circulated gas in the separating space S1 is enhanced, thus making it possible to enhance the separation performance without expanding the space in the vertical direction.

Moreover, in this embodiment, in the gas/liquid separator 10, the groove 44 is formed on the lower surface 42 of the body 40, and thus the gas/liquid separator 10 includes the passage which guides, to the supply port 45, the circulated gas supplied from the lower (water reservoir 30) side in the vertical direction after changing the direction to the horizontal direction. By changing the direction of the circulated gas to be supplied, fine water droplets are coalesced on the wall surfaces of the passage, and as a result, the water in the circulated gas flows into the separating space S1 in a state where the water particle diameter thereof is increased. Therefore, it is made possible to easily separate the water in the separating space S1.

Moreover, the passage of the body 40, which is composed of this groove 44, has a bent shape so as to guide the fluid direction so that its course is bent to the horizontal plane and then directed to the supply port 45 along the tangential direction of the side wall surface 43. In the state where the circulated gas is at a low flow rate, there are possibilities that the coalesced water can run back and that the passage is closed by flooding. However, such malfunctions can be solved by bending the passage. Moreover, the circulated gas is guided to the supply port 45 along the tangential direction of the side wall surface 43, thus making it possible to suppress such matters as the splash of water adhered onto the supply port 45.

Figure 12:
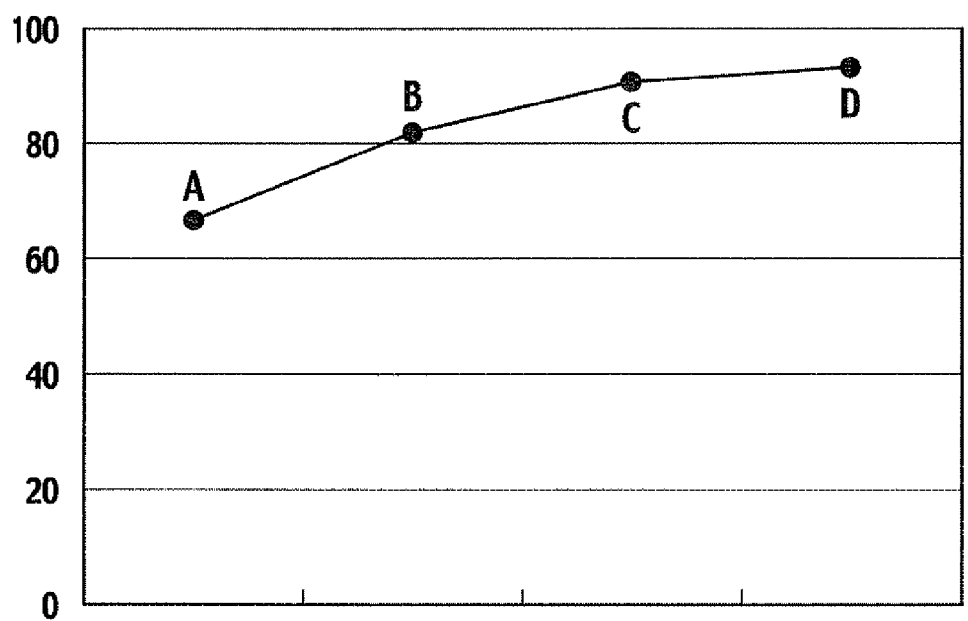
FIG. 12 is a graph showing separation performance.

FIG. 12 is an explanatory view showing the separation performance. An axis of ordinates shown in this graph represents experiment results of separation ratios (%) of the water to the supplied circulated gas. In this experiment, as flow rate conditions of the circulated gas, the gas flow rate is set at 700 L/min, and a moisture amount is set at 700 cc/min. Here, plot A represents an experiment result of a conventional article, that is, of a gas/liquid separator which does not include the guide portion 49 and the scupper ring 50 in the separating space, and the plot A shows a separation ratio of approximately 65%. Meanwhile, plots B to D represent experiment results of the gas/liquid separator 10 shown in this embodiment. The plot B represents an experiment result in the case where only the scupper ring 50 is provided in the separating space S1, and the plot B shows a separation ratio of approximately 80%. Moreover, the plot C represents an experiment result in the case where the scupper ring 50 is provided in the separating space S1 and three guide portions 49 are formed in the circumferential direction, and the plot C shows a separation ratio of approximately 90%. Meanwhile, the plot D represents an experiment result in the case where the scupper ring 50 is provided in the separating space S1 and seven guide portions 49 are formed in the circumferential direction, and the plot D shows a separation ratio of approximately 90% or more. As seen from the experiment results as described above, the separation ratio of 90% or more can be ensured by providing a scupper ring in combination with three or more guide portions 49 in the circumferential direction.

Figure 13:
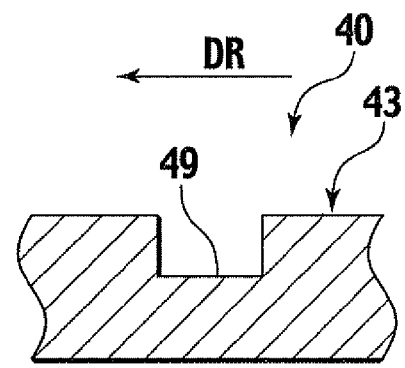
FIG. 13 is an explanatory view explaining a modification example of the guide portion 49.
Figure 14:
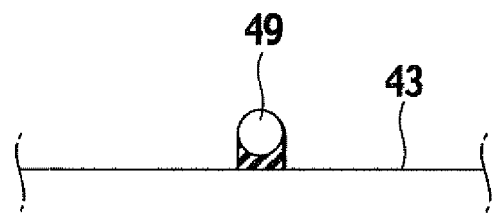
FIG. 14 is an explanatory view explaining a modification example of the guide portion 49.
Figure 15:
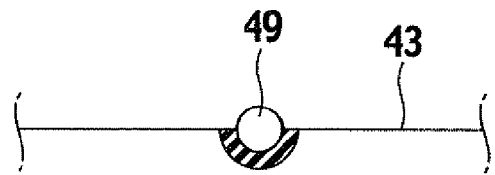
FIG. 15 is an explanatory view explaining a modification example of the guide portion 49.

Note that, though the preferred embodiment of the gas/liquid separator 10 has been described above, various modifications are possible for the variety of elements constituting this gas/liquid separator 10 as long as the functions inherent therein can be exerted. First, though each guide portion 49 has a configuration in which the side wall surface 43 of the body 40 is formed into the projection shape, the present invention is not limited to this. As shown in FIG. 13, the guide portion 49 may be formed by a concave groove hollowing to the inside of the side wall surface 43. Even according to this form, the separated water which moves on the side wall surface 43 along the swirl flow is guided downward (to the water reservoir side) along the spiral groove when the separated water reaches the guide portion 49. Thus, the separated water adhered onto the side wall surface 43 can be guided to the water reservoir 30 effectively. Moreover, for example, it is also possible to form the guide portion 49 by a coil. Specifically, a coil of which outer diameter is larger than an inner diameter of the side wall surface 43 may be prepared, and the coil may be inserted into the separating space S1 of the body 40 in a state of being compressed inward, and may be bonded to the side wall surface with urging force of its own. In this case, as shown in FIG. 14 which is a A-A cross-sectional view of FIG. 9, the coil is provided in a state of being bonded to the side wall surface 43. Moreover, as shown in FIG. 15, it is possible to bond the coil after forming the groove to the side wall surface 43. Thus, a thickness of the coil itself functions as the projections, and the coil can exert similar effect and function to those of the guide portion 49 with the above-described projection shape.

Figure 16:
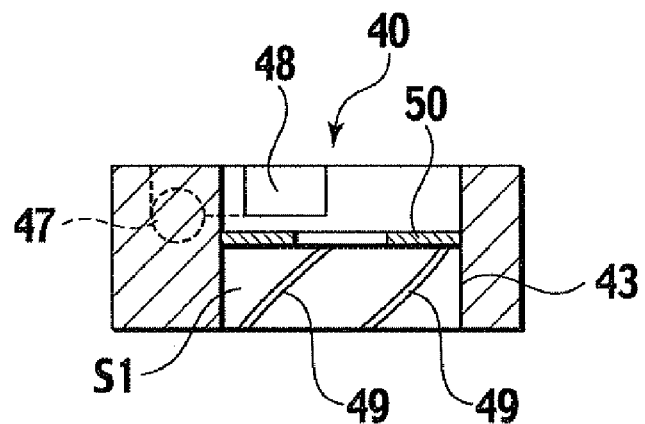
FIG. 16 is an explanatory view explaining a modification example of a scupper ring 50.
Figure 17:
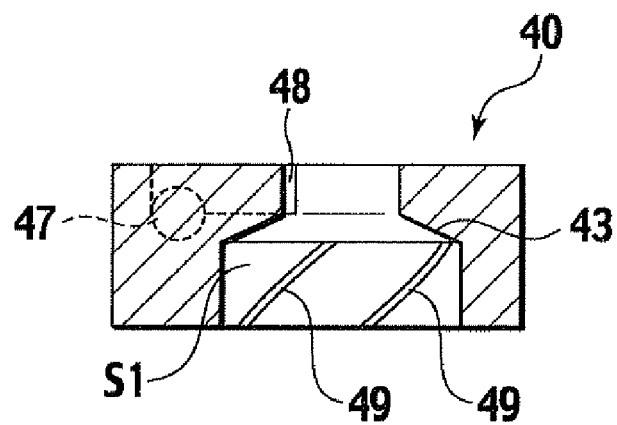
FIG. 17 is an explanatory view explaining a modification example of the scupper ring 50.

FIGS. 16 and 17 are explanatory views showing a modification example of the scupper ring 50. In this embodiment, the scupper ring 50 is attached to be inclined to the supply port 45 side, however, as shown in FIG. 16, the scupper ring 50 may be attached to be located horizontally. Moreover, besides the configuration in which the scupper ring 50 is independent, as shown in FIG. 17, a cross-sectional shape of the separating space S1, which is perpendicular to the vertical direction, may be formed into a shape reduced step by step from the supply port 45 side toward the discharge port 48 side in such manner that the inner diameter of the side wall surface 43 may be changed step by step. Even with such a form, similar function and effect to those of the scupper ring 50 composed as an independent member can be exerted.

Figure 18:
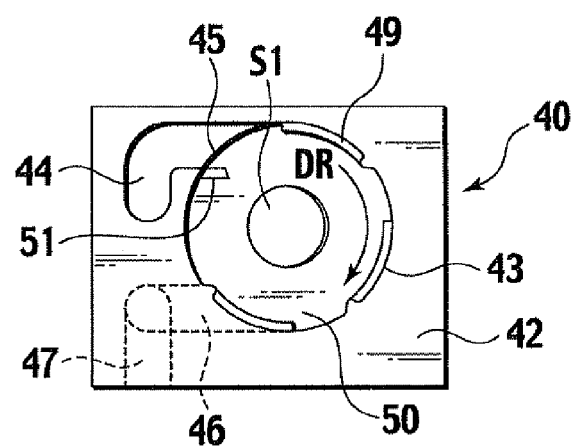
FIG. 18 is an explanatory view of a scupper plate 51.

Incidentally, in the vicinity of the supply port 45 formed on the side wall surface 43, there is a possibility that the separated water adhered onto the side wall surface 43 is splashed to the separating space S1 by the circulated gas from the supply port 45, which flows thereinto. Accordingly, a scupper plate 51 may be provided in the vicinity of a junction of the swirl flow which swirls in the inside of the separating space S1 and the flow which comes from the supply port 45 (for example, in the vicinity of the supply port 45 which is in the discharge port 48 side). As shown in FIG. 18, this scupper plate 51 is composed by erecting, from the side wall surface 43, a plate-like member extended on the side wall surface 43 in the vertically downward direction. By providing this scupper plate 51, a course of the separated water which moves on the side wall surface 43 along the swirl flow is inhibited by the scupper plate 51 extended in the vertical direction. Accordingly, it is possible to suppress an occurrence of such matters as the splash of the separated water by the circulated gas which flows in from the supply port 45.

In addition, in this embodiment, and since the supply port 45 and the discharge port 48 are adjacent to each other, it is possible to balance the enhancement of separation performance and compactness, and accordingly, it is possible to be easily put on a vehicle.

Note that, in this embodiment, though the gas/liquid separator 10 is provided in the hydrogen supply passage L1 on an upstream side of the hydrogen circulation pump 4, the present invention is not limited to this. For example, as shown in a dash line of FIG. 1, it is possible to be provided in the air discharge passage L4 on a downstream side of the air pressure regulation valve 6 and be provided in the air supply passage L3. In addition, in this embodiment, thus the high-pressure hydrogen tank is exemplified as the fuel cell system, it is possible to adopt the device to a fuel reformer. In this case, the gas/liquid separator is provided in between the not-shown fuel reformer of the fuel supply passage L1 and the fuel cell stack 1. In each case, it is possible to separate an excess water from the reaction gas (the fuel gas and the oxidizing gas). Moreover, for example, the water that is collected may be supplied to a not-shown humidifier provided in the air supply passage L1.

Second Embodiment

FIG. 19 to FIG. 22 are explanatory views of a body 40 of a gas/liquid separator 10 according to a second embodiment of the present invention. As compared with the body 40 of the first embodiment, the body 40 according to this second embodiment has a main feature to include a projection 52 which introduces the separated hydrogen gas into the discharge port 48. Note that the same reference numerals will be assigned to similar configurations to those of the above-described embodiment, and a detailed description thereof will be omitted.

Figure 19:
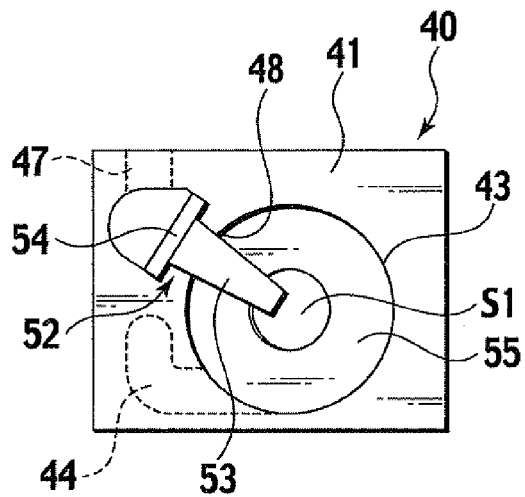
FIG. 19 is a top view of a body 40 of a gas/liquid separator 10 according to a second embodiment.
Figure 20:
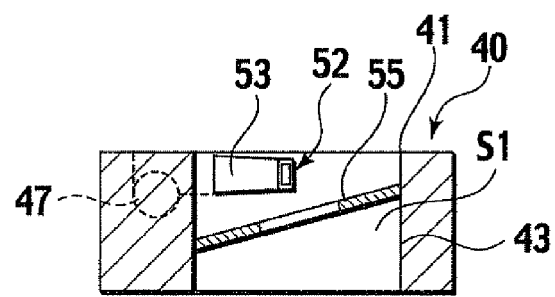
FIG. 20 is a cross-sectional view of the body 40 shown in FIG. 19.

FIG. 19 is a top view of the body 40, and FIG. 20 is a cross-sectional view of the body 40 shown in FIG. 19. The projection 52 has a structure of projecting from the discharge port 48 formed on the side wall surface 43 toward the center of the separating space S1, and is composed of a tubular hollow member 53 in which both ends are opened. One end of this hollow member 53 is connected to the discharge port 48 side, and the other end (tip) thereof is extended to the vicinity of the center of the separating space S1. In other words, by this projection 52, the body 40 according to this embodiment has a configuration in which the discharge port 48 is extended to the vicinity of the center region of the separating space S1. For the purpose of ensuring air tightness with the discharge port 48, the hollow member has a form in which one end thereof enters into the inside of the discharge port 48 while being jointed, and a gasket 54 is attached to this end. Note that, though it is possible to not attach the gasket 54, by attaching the gasket 54 fluid leakage from between connections is prevented.

Figure 21:
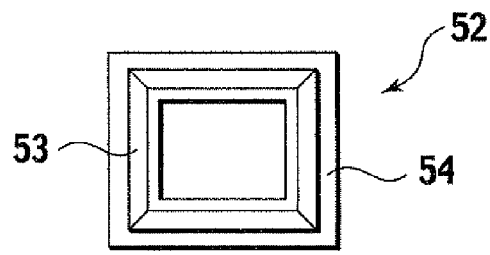
FIG. 21 is a view which views a projection 52 from a tip side.
Figure 22:
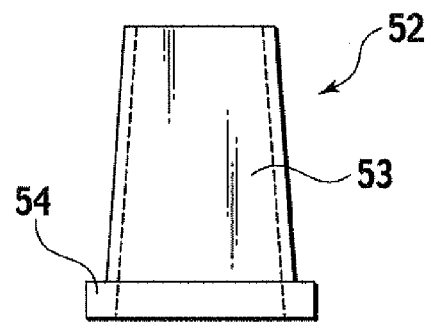
FIG. 22 is a view which views the projection 52 from the above.

FIG. 21 is a view which views the projection 52 from a tip side thereof, and FIG. 22 is a view which views the projection 52 from the above. The hollow member 53 constituting the projection 52 has a shape which a cross section of a hollow region thereof is rectangle, and a cross-sectional shape of the hollow region has a shape widened from the tip side toward the gasket 54 side.

As shown in FIG. 19, in the second embodiment, the body 40 does not have the scupper ring 50 and the guide portions 49 shown in the first embodiment; however, a water shielding plate 55 is provided in place of these members. The water shielding plate 55 is a plate-like member which has plural vent holes passing the circulated gas therethrough, and is brought into inner contact with the side wall surface 43 which forms the separating space S1. This water shielding plate 55 is provided between the discharge port 48 of the body 40 and the supply port 45 thereof, and has an inclined form to the supply port 45 side. As shown in FIGS. 6 and 7, a specific configuration of the water shielding plate 55 is similar to that of the splash prevention plate 36 in the first embodiment, and is composed in such a manner that a plurality of linear wavy portions in which a plate material is projected intermittently by being cut and raised upward are arrayed adjacent to one another. In other words, the cut and raised portions constituting the wavy portions function as the plural vent holes. Note that, a pitch interval of the wavy portions of the water shielding plate 55 is made larger than that of the splash prevention plate 36, and a contrivance is made so as not to inhibit the swirl flow which swirls in the separating space S1 to the maximum extent possible.

As described above, according to this embodiment, the discharge port 48 adopts a configuration that the hydrogen gas flowing out of the inner space S1 through the discharge port 48 is hard to be affected by the separated water in this space S1. Specifically, the hydrogen gas is guided from the center of the separating space S1, in which the water content is low, to the discharge port 48 side by the projection 52, the discharge port 48 is extended to the vicinity of the center of the separating space S1, thus making it possible to effectively discharge the hydrogen gas which does not contain the moisture. Moreover, the water in the hydrogen gas is adhered onto the side wall surface 43 which forms the separating space S1 by centrifugal force, and the adhered moisture falls below to the water reservoir 30 by its own weight, and accordingly, it is made possible to separate the water continuously.

In this embodiment, the projection S2 is composed of the hollow member 53 which enters into the inside of the discharge port 48 while being jointed to that of the discharge port 48. Thus, the water adhered onto the side wall surface 43 and the top plate 20 can be restricted from flowing into the discharge port 48. Furthermore, the cross-sectional shape of the hollow region of the hollow member 53 is formed into a shape widened from the tip side, and a pressure loss can be thus suppressed, and accordingly, flowing out performance the hydrogen gas can be enhanced.

Figure 23:
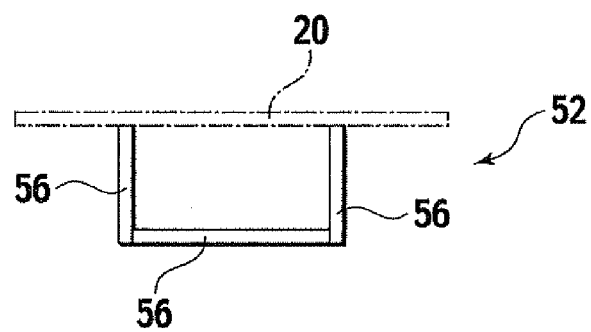
FIG. 23 is an explanatory view explaining a modification example of the projection 52.
Figure 24:
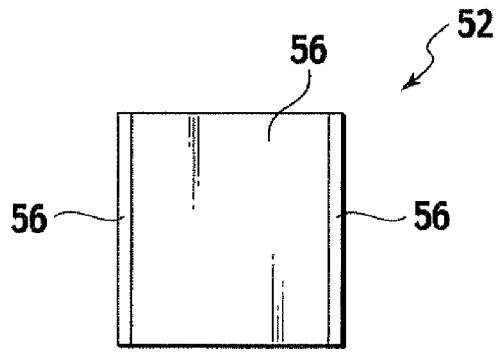
FIG. 24 is a view which views the projection 52 shown in FIG. 23 from the above.

Note that, though the hollow member 53 is used as the projection 52 which guides the hydrogen gas to the discharge port 48 side, the present invention is not limited to this, and, as illustrated in FIG. 23 to FIG. 28, various forms can be adopted for the projection 52. For example, as shown in FIG. 23 to FIG. 26, the projection 52 may be composed of one or more plate-like members 56. In this case, the plate-like members 56 constituting the projection 52 are connected to the discharge port 48 so as to inhibit the water adhered onto the side wall surface 43 from flowing into the discharge port 48. FIG. 23 is an explanatory view explaining a modification example of the projection 52, and FIG. 24 is a view which views the projection 52 shown in FIG. 23 from the above. In an example shown in FIG. 23 and FIG. 24, the projection 52 is composed of three plate-like members 56, and has a form to constitute a concave passage by these three plate-like members 56. By connecting the projection 52 as described above to the discharge port 48, the hydrogen gas in the center portion of the separating space S1 can be guided to the discharge port 48, and in addition, the water can be restricted from flowing from the side wall surface 43 to the discharge port 48. Note that, as shown in a dash line of FIG. 23, a hollow member can be formed by connecting the concave passage as described above to the top plate 20.

Figure 25:
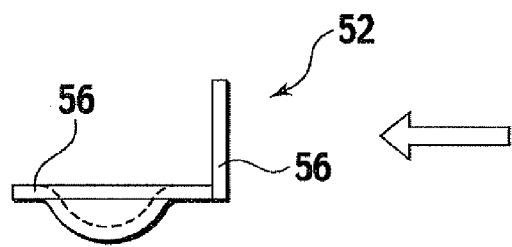
FIG. 25 is an explanatory view explaining a modification example of the projection 52.
Figure 26:
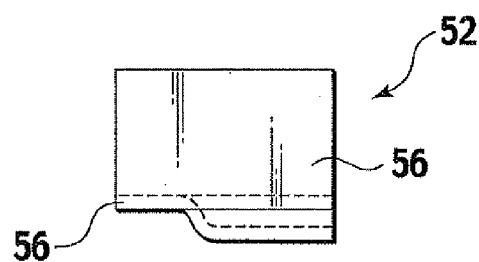
FIG. 26 is a view which views the projection 52 shown in FIG. 25 from the above.
Figure 27:
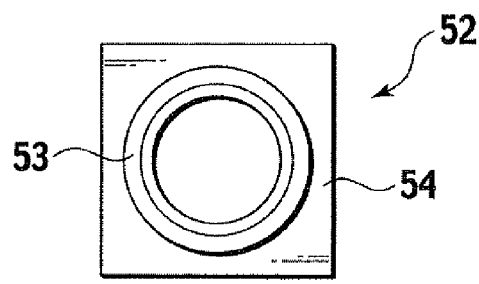
FIG. 27 is an explanatory view explaining a modification example of the projection 52.
Figure 28:
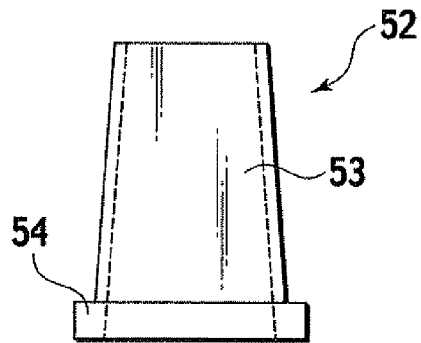
FIG. 28 is a view which views the projection 52 shown in FIG. 27 from the above.

FIG. 25 is an explanatory view explaining a modification example of the projection 52, FIG. 26 is a view which views the projection 52 shown in FIG. 25 from the above. Moreover, in an example shown in FIG. 25 and FIG. 26, the projection 52 is composed of two plate-like members, and has a form to constitute a substantially L-shape passage (in here, one of the plate-like member 56 is provided while being opposed to a direction of the swirl flow (an arrow in the figure) of the gas by these two plate-like members 56. By connecting the projection 52 as described above to the discharge port 48, the hydrogen gas in the center portion of the separating space S1 can be guided to the discharge port 48, and in addition, the water can be restricted from flowing from the side wall surface 43 into the discharge port 48. Note that, from such a viewpoint of reducing the pressure loss of the hydrogen gas which flows out, as shown in FIGS. 25 and 26, it is also effective to modify a part of the plate-like member 56 so that the width of the passage located on the discharge port 48 side can be widened. As opposed to this, when the projection 52 is composed of the hollow member 53, it is not necessary to limit the cross-sectional shape of the hollow member 53 to the rectangular shape. For example, various shapes can be adopted like a circular shape as shown in FIGS. 27 and 28.

Third Embodiment

Figure 29:
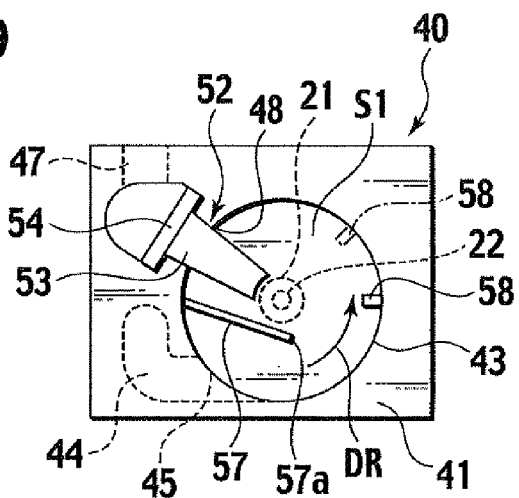
FIG. 29 is a top view of a body 40 of a gas/liquid separator 10 according to a third embodiment.

FIG. 29 is an explanatory view of a body 40 of a gas/liquid separator 10 according to a third embodiment of the present invention. As compared with the body 40 of the second embodiment, a body 40 according to this third embodiment has a main feature to further include a wind directing plate 57 and a scupper plate 58.

Note that, in the third embodiment, the water shielding plate 55 shown in the second embodiment is not attached into the inner space of the body 40. Meanwhile, on a joined surface of the top plate 20 to the body 40, a columnar swirl center 21 erected in the vertical direction is provided. This swirl center 21 is provided at such a position where the swirl center 21 penetrates through the center portion of the separating space S1 of the body 40 when the top plate 20 and the body 40 are joined to each other, and has a length to an extent where a tip thereof reaches the water reservoir space S2 of the water reservoir 30. The swirl center 21 is in charge as a swirl center of the swirl flow in the separating space S1. Note that, for example, the swirl center 21 is a hollow member, and in the swirl center 21, a level sensor which detects a level of the water accumulated in the water reservoir space S2 is provided. In such a configuration in which the swirl center 21 is provided, it is preferable that the projection 52 be projected to the vicinity of the swirl center 21, and it is desirable that a projected tip thereof have a shape corresponding to an outer circumference shape of the swirl center 21. Thus, it is made possible to effectively guide, to the discharge port 48, the hydrogen gas which swirls along the swirl center 21.

The wind directing plate 57 as one of a feature of this embodiment is provided on the side wall surface 43 from the discharge port 48 to the supply port 45 by taking, as a reference, the rotation direction DR in which the circulated gas supplied to the separating space S1 swirls. The wind directing plate 57 is composed by extending a plate-like member, which is erected from the side wall surface 43 toward the swirl center 21 along the side wall surface 43, in the vertically downward direction. By this wind directing plate 57, the circulated gas is restricted from directly flowing into the discharge port 48 from the supply port 45. Therefore, the swirl of the circulated gas in the separating space S1 is urged, and the centrifugal force for separating the water is obtained, and accordingly, separation performance can be enhanced.

Here, with regard to the wind directing plate 57, a tip 57a of the plate-like member extended to the center of the separating space S1 reaches the vicinity of the swirl center 21. More specifically, the wind directing plate 57 has such a form, in which the tip 57a of the plate-like member is inclined to the supply port 45 side with respect to the swirl center 21, and the tip 57a of the plate-like member reaches a position where the plate-like member covers the swirl center 21 from the circulated gas which flows in from the supply port 45. By the wind directing plate 57 as described above, the circulated gas containing the water can be restricted from being adhered onto the swirl center 21.

The scupper plate 58 is provided on the side wall surface 43 from the supply port 45 to the discharge port 48 along the rotation direction DR of the swirl flow in the separating space S1, and has a configuration in which the plate-like member erected from this side wall surface is extended on the side wall surface 43 in the vertically downward direction. By providing this scupper plate 58, the separated water which moves on the side wall surface 43 along the swirl flow is coalesced on the plate-like scupper plate 58 extended in the vertical direction, and is guided downward (to the water reservoir side). Thus, the separated water adhered onto the side wall surface 43 can be guided to the water reservoir 30 effectively, and accordingly, the separation performance for the hydrogen gas and the water can be enhanced.

It is more preferable that the scupper plate 58 be provided on an intermediate portion between the supply port 45 and the discharge port 48 or on the discharge port 48 side from this intermediate portion along the rotation direction DR of the swirl flow. Thus, the scupper plate 58 can be provided in a region where the separated water is easier to concentrate, and accordingly, the separation performance for the hydrogen gas and the water can be further enhanced. Note that not only the scupper plate 58 is provided singly but also a plurality of the scupper plates 58 may be provided in plural regions. In this case, as shown in a dash line of FIG. 29, it is preferable that the scupper plate 58 be provided in a downstream side of the place where the scupper plate 58 is provided in this embodiment. Thus, the separated water adhered onto the side wall surface 43 can be guided to the water reservoir 30 by the individual scupper plates 58, and accordingly, the separation performance the hydrogen and the water can be enhanced.

Figure 30:
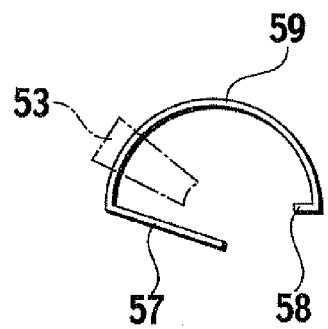
FIG. 30 is a top view of a wind directing plate 57 and a scupper plate 58 which are formed integrally.
Figure 31:
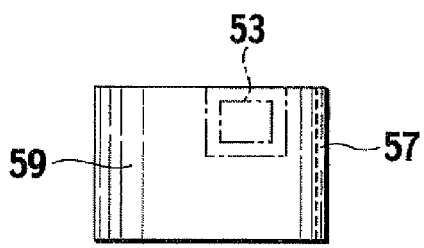
FIG. 31 is a side view of the wind directing plate 57 and the scupper plate 58 which are formed integrally.
Figure 32:
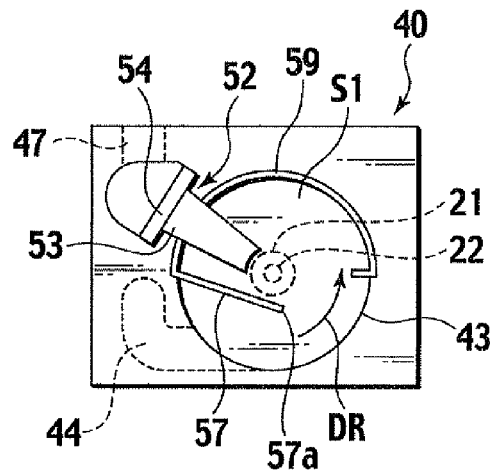
FIG. 32 is explanatory view explaining a state where the wind directing plate 57 and the scupper plate 58 which are formed integrally are fitted in the body 40.

As described above, according to this embodiment, the wind directing plate 57 and the scupper plate 58 are provided, thus making it possible to effectively separate the circulated gas into the hydrogen gas and the water. Note that the wind directing plate 57 and the scupper plate 58 may be composed in such a manner that both are integrally formed in advance by bending both ends of a plate-like member 59 including a curved surface along the side wall surface 43 as shown in FIGS. 30 and 31, and that this plate-like member 59 is then fixedly attached onto the side wall surface 43 by brazing and the like as shown in FIG. 32. In here, FIG. 30 is a top view of a wind directing plate 57 and a scupper plate 58 which are formed integrally, FIG. 31 is a side view of the wind directing plate 57 and the scupper plate 58 which are formed integrally. Moreover, FIG. 32 is explanatory view explaining a state where the wind directing plate 57 and the scupper plate 58 which are formed integrally are fitted in the body 40. According to this form, since the wind directing plate 57 and the scupper plate 58 are provided by a simple technique, it becomes unnecessary to process the side wall surface 43, and a manufacturing process can be simplified. Moreover, in this embodiment, thus the wind directing plate 57 and the scupper plate 58 are formed integrally, as shown in dash line in FIG. 31, productivity can be enhanced by being integrally formed further adding the hollow member 53. Note that, if a space between the side wall surface 43 and the plate-like member 59 in which the wind directing plate 57 and the scupper plate 58 are integrally formed is sealed by a liquid gasket, such matters that the separated water flows into the discharge port 48 side can be suppressed.

Figure 33:
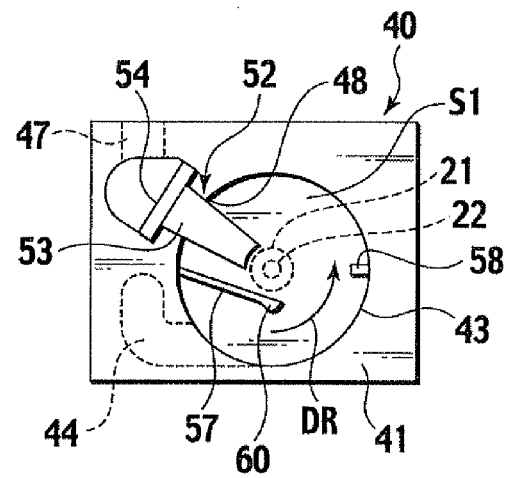
FIG. 33 is an explanatory view explaining a modification example of the wind directing plate 57.

Moreover, as shown in FIG. 33, the wind directing plate 57 may include, on the tip of the plate-like member, a convex scupper portion 60 which projects toward the supply port 45 side. Thus, an occurrence of such matters that the separated water adhered onto the wind directing plate 57 is splashed can again be suppressed.

Figure 34:
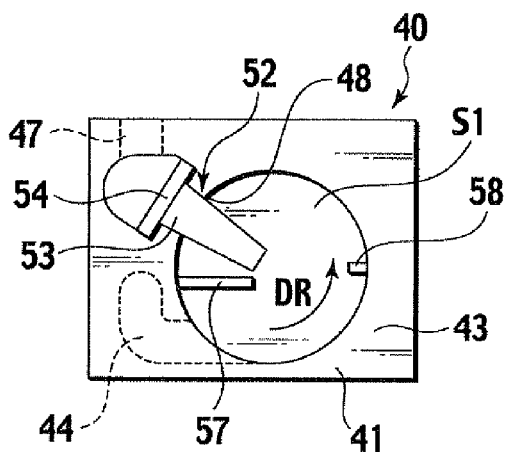
FIG. 34 is an explanatory view explaining a modification example of the wind directing plate 57.

Note that, though the description has been made of the mode in which the swirl center 21 is provided on the top plate 20 in the above-described embodiment, it is not always necessary to provide the swirl center 21 on the top plate 20 as described in the first or second embodiment. In this case, as shown in FIG. 34, the wind directing plate 57 just needs to be composed so that the tip of the plate-like member can reach the center of the separating space S1. Even with such a configuration, the circulated gas can be restricted from directly flowing into the discharge port 48 from the supply port 45. Thus, the swirl of the circulated gas in the separating space S1 is urged, and the centrifugal force for separating the water is obtained. Accordingly, the separation performance can be enhanced.

Fourth Embodiment

Figure 35:
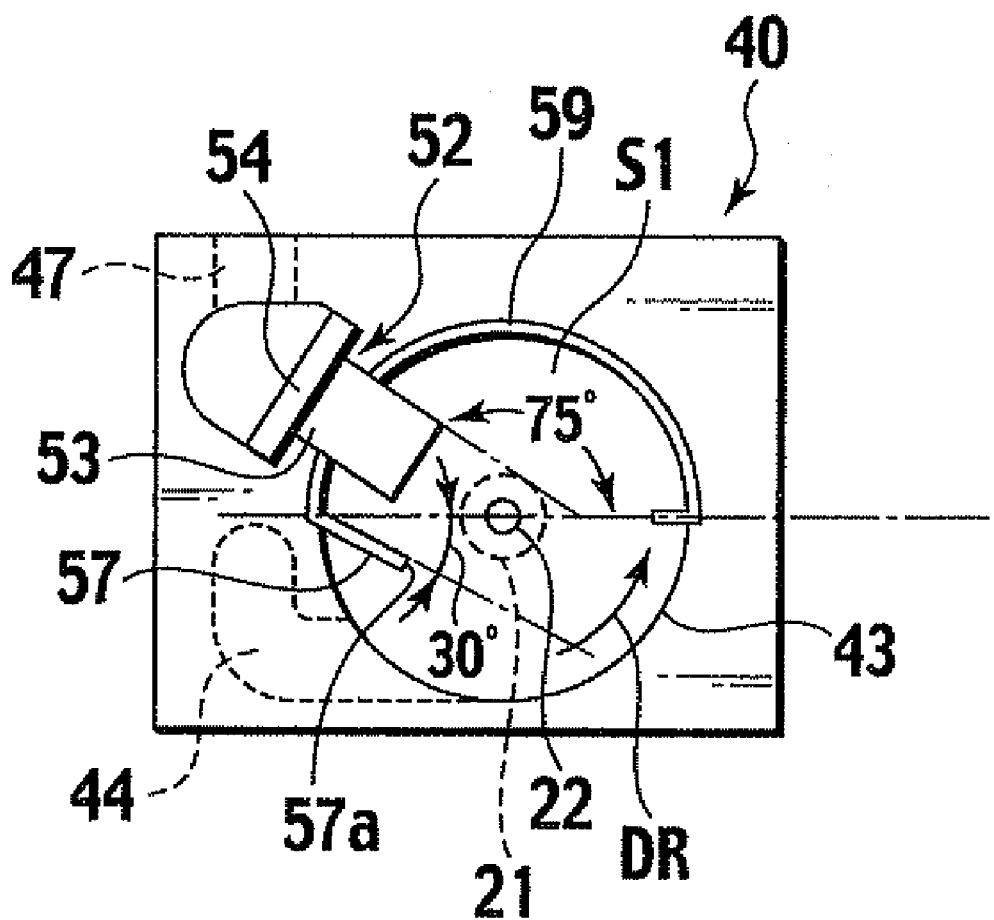
FIG. 35 is an explanatory view explaining a body 40 of a gas/liquid separator 10 according to a fourth embodiment.

FIG. 35 is explanatory views of a body 40 of a gas/liquid separator 10 according to a fourth embodiment of the present invention. It is a one of a feature of this embodiment that an angle of the wind directing plate 57 is defined. Though, the separation performance for the water can be enhanced so as to make that of the wind directing plate 57 large, there is a trend which the pressure loss is suppressed. Therefore, 30 degrees to the flowing direction of the circulation gas from the supply port 45 is defined as an optimum value for the water separating performance and reducing the pressure loss. Note that an opening part of the projection 52 has an angle which is 75 degrees to the flowing direction of the circulation gas from the supply port 45.

Furthermore, in this embodiment, as shown in FIG. 35, the point that the separating space S1 makes large, the point that the tip of the projection 52 and the wind directing plate 57 is slightly set apart from the center of the separating space S1, the point that the projection 52 is linear straight shape, and the point that the hollow member 53 is rectangular solid shape are one of the features. By being adopted according to the configurations as stated above, it is possible to circulate the gas which is separated the water in a state that reduces the pressure drop. Note that, the separating space S1 is not limited to the cylindrical shape according to a cross-sectional shape but an ellipsoidal shape can be used instead.

The description has been made above of the preferred first to third embodiments. However, the present invention is not limited to the above description, and it is also possible to constitute the gas/liquid separator 10 by appropriately combining the techniques disclosed herein.

INDUSTRIAL APPLICABILITY

This gas/liquid separator can be used not only for the circulation system of the fuel gas of the fuel cell system but also generally for the purpose of separating fluid in which gas and liquid are mixed together into the gas and the liquid.

The invention claimed is:

1. A gas/liquid separator, comprising:
   a body which swirls fluid supplied into a tubular inner space formed by a side wall surface thereof along said side wall surface, thereby separating the fluid into liquid and gas, and in which the inner space is extended in a vertical direction;
   a supply port from which the fluid flows into the inner space, the supply port being provided on the side wall surface; and
   a discharge port through which the separated gas flows out of the inner space, the discharge port being provided on the side wall surface,
   wherein the discharge port is provided above the supply port, and
   the body includes a passage which guides to the supply port, the fluid supplied from a lower side of the body in the vertical direction after changing a course of the fluid to a horizontal direction.

2. The gas/liquid separator according to claim 1, further comprising:
   a liquid guide portion extended in a spiral shape on the side wall surface of the body in the vertically downward direction while being inclined in a rotation direction in which the fluid supplied to the inner space of the body swirls,
   wherein the liquid guide portion is composed of a convex projection which projects from the side wall surface to a center direction of the inner space, and
   the liquid guide portion has a minutely undulated surface shape from the upstream side of the fluid swirling in the inner space of the body to the downstream side thereof.

3. The gas/liquid separator according to claim 1, further comprising:
a liquid guide portion extended in a spiral shape on the side wall surface of the body in the vertically downward direction while being inclined in a rotation direction in which the fluid supplied to the inner space of the body swirls,
wherein three or more liquid guide portions are individually formed at positions different from one another in a circumferential direction of the side wall surface.

4. The liquid/gas separator according to claim 1, further comprising:
a liquid guide portion extended in a spiral shape on the side wall surface of the body in the vertically downward direction while being inclined in a rotation direction in which the fluid supplied to the inner space of the body swirls,
wherein the liquid guide portion is composed of a convex projection which projects from the side wall surface to a center direction of the inner space, and
the projection is composed in such a manner that a coil with an outer diameter larger than the inner diameter of the side wall surface is inserted into the inner space of the body, and is brought into pressure contact with the side wall surface by urging force of the coil itself.

5. The liquid/gas separator according to claim 1, further comprising:
a plate-like scupper ring brought into inner contact with the side wall surface of the body along the circumferential direction, the scupper ring having an opening formed in a center thereof,
wherein the scupper ring is provided between the discharge port and the supply port in the vertical direction, and
the scupper ring is provided to be inclined downwardly toward the supply port.

6. The liquid/gas separator according to claim 1, further comprising:
a scupper plate composed of a plate-like member extended on the side wall surface in the vertically downward direction, the scupper plate being provided in a vicinity of a junction of the fluid which swirls in the inner space of the body and the fluid which flows in from the supply port.

7. The gas/liquid separator according to claim 1, wherein, in the body, a cross-sectional shape of the inner space, the cross-sectional shape being perpendicular to the vertical direction, has a shape reduced step by step from the supply port side to the discharge port.

8. The gas/liquid separator according to claim 1, further comprising:
a projection which introduces the separated gas to the discharge port, the projection projecting from the discharge port toward a center of the inner space of the body,
wherein the projection is composed of a tubular hollow member in which both ends are opened,
in the hollow member, one end is connected to the discharge port side, and the other end projects to the center of the inner space, and
in the hollow member, a cross-sectional shape of a hollow region thereof is rectangular.

9. The gas/liquid separator according to claim 1, further comprising:
a projection which introduces the separated gas to the discharge port, the projection projecting from the discharge port toward a center of the inner space of the body,
wherein the projection is composed of a tubular hollow member in which both ends are opened,
in the hollow member, one end is connected to the discharge port side, and the other end projects to the center of the inner space, and
in the hollow member, the cross-sectional shape of the hollow region is widened from the other end to the one end.

10. The gas/liquid separator according to claim 1, further comprising:
a wind directing plate which regulates the fluid against flowing from the supply port to the discharge port without swirling in the inner space, the wind directing plate being provided on the side wall surface between the discharge port and the supply port by taking, as a reference, a rotation direction in which the fluid supplied to the inner space of the body swirls,
wherein the discharge port is positionally offset from the supply port in a circumferential direction of the side wall surface in the body,
the wind directing plate comprises a plate-like member projecting from the side wall surface into the tubular inner space and is extended on the side wall surface in a vertically downward direction, and
in the wind directing plate, a tip of the plate-like member reaches the vicinity of a center of the inner space of the body.

11. The gas/liquid separator according to claim 1, further comprising:
a wind directing plate which regulates the fluid against flowing from the supply port to the discharge port without swirling in the inner space, the wind directing plate being provided on the side wall surface between the discharge port and the supply port by taking, as a reference, a rotation direction in which the fluid supplied to the inner space of the body swirls,
wherein the discharge port is positionally offset from the supply port in a circumferential direction of the side wall surface in the body,
the wind directing plate comprises a plate-like member projecting from the side wall surface into the tubular inner space and is extended on the side wall surface in a vertically downward direction, and
the wind directing plate includes, on the tip of the plate-like member, a convex scupper portion which projects toward the supply port.

12. The gas/liquid separator according to claim 1, further comprising:
a wind directing plate which regulates the fluid against flowing from the supply port to the discharge port without swirling in the inner space, the wind directing plate being provided on the side wall surface between the discharge port and the supply port by taking, as a reference, a rotation direction in which the fluid supplied to the inner surface of the body swirls; and
a scupper plate composed of a plate-like member extended on the side wall surface in a vertically downward direction, the scupper plate being provided on the side wall surface between the supply port and the discharge port by taking, as a reference, the rotation direction in which the fluid supplied to the inner surface of the body swirls,
wherein the discharge port is positionally offset from the supply port in a circumferential direction of the side wall surface in the body,
the wind directing plate comprises a plate-like member projecting from the side wall surface into the tubular inner space and is extended on the side wall surface in the vertically downward direction, and the scupper plate is provided on an intermediate portion between the supply port and the discharge port or toward the discharge port from the intermediate portion.

13. The gas/liquid separator according to claim 1, further comprising:

a projection which introduces the separated gas to the discharge port, the projection projecting from the discharge port to a center of the inner space of the body; and a water shielding plate composed of a plate-like member brought into inner contact with the side wall surface which forms the inner space of the body, the water shielding plate being provide between the discharge port and the supply port, wherein the water shielding plate is provided to be inclined downwardly toward the supply port, and has plural vent holes for passing the fluid therethrough.

14. The gas/liquid separator according to claim 1, wherein the passage of the body has a bent shape guiding the fluid of which course is changed to the horizontal direction to the supply port along a tangential direction of the side wall surface after bending the fluid on a horizontal plane.

15. The gas/liquid separator according to claim 1, wherein the reservoir includes:

an inner passage which penetrates to the vertical direction and communicates with the passage of the body; and a sealing portion in which a periphery of an opening of the inner passage connected to the passage of the body is projected into a ring shape in the opening.

16. The gas/liquid separator according to claim 1, further comprising:

a top plate which hermetically seals the inner space of the body by being attached onto the upper surface side of the body;

a reservoir which includes an inner space communicating with the inner space of the body by being attached onto the lower surface side of the body, and stores the liquid separated in the body; and a splash prevention plate which regulates the fluid accumulated in the inner space of the reservoir from flowing into the body side, the splash prevention plate being brought into inner contact with the side wall surface which forms the inner space of the reservoir, wherein the inner space penetrates from an upper surface side of the body to a lower surface side thereof in a vertical direction, the supply port is provided on the side wall surface on the upper surface side of the body, the discharge port is provided on the side wall surface on the lower surface side of the body, the splash prevention plate has a plurality of scupper holes from which the liquid separated in the body falls to the inner space of the reservoir, and the scupper holes are composed in such a manner that a plurality of linear wavy portions in which a plate material is projected intermittently by being cut and raised upward are arrayed adjacent to one another.

17. The gas/liquid separator according to claim 1, further comprising:

a liquid guide portion extended in a spiral shape on the side wall surface of the body in the vertically downward direction while being inclined in a rotation direction in which the fluid supplied to the inner space of the body swirls, wherein the liquid guide portion is composed of a convex projection which projects from the side wall surface to a center direction of the inner space, and in the liquid guide portion, an erection angle of a side surface thereof is made acute, the side surface corresponding to an upstream side of the fluid swirling in the inner space of the body.

18. The gas/liquid separator according to claim 17, wherein, in the liquid guide portion, an erection angle of a side surface thereof, the side surface corresponding to a downstream side of the fluid swirling in the inner space of the body, is made gentler than erection angle of the side surface corresponding to the upstream side of the fluid.

19. The gas/liquid separator according to claim 1, further comprising:

a projection which introduces the separated gas to the discharge port, the projection projecting from the discharge port toward a center of the inner space of the body; and a columnar swirl center serving as a swirl center of the fluid, the swirl center being extended in the inner space of the body in the vertical direction, wherein the projection projects toward a vicinity of the swirl center.

20. The gas/liquid separator according to claim 19, wherein, in the projection, a projected end has a shape corresponding to an outer circumference shape of the swirl center.

21. The gas/liquid separator according to claim 19, further comprising:

a wind directing plate which regulates the fluid against flowing from the supply port to the discharge port without swirling in the inner space, the wind directing plate being provided on the side wall surface between the discharge port and the supply port by taking, as a reference, a rotation direction in which the fluid supplied to the inner space of the body swirls, wherein the discharge port is positionally offset from the supply port in a circumferential direction of the side wall surface in the body, the wind directing plate comprises a plate-like member projecting from the side wall surface toward the swirl center- and is extended on the side wall surface in a vertically downward direction, and in the wind directing plate, a tip of the plate-like member is provided to be inclined toward the supply port with respect to the swirl center, and the tip of the plate-like member reaches a position where the plate-like member covers the swirl center from the fluid which flows in from the supply port.

22. The gas/liquid separator, comprising:

a body which swirls fluid supplied into a tubular inner space formed by a side wall surface thereof along said side wall surface, thereby separating the fluid into liquid and gas, and in which the inner space is extended in a vertical direction;

a supply port from which the fluid flows into the inner space, the supply port being provided on the side wall surface;

a discharge port through which the separated gas flows out of the inner space, the discharge port being provided on the side wall surface, wherein the discharge port is provided above the supply port;

a wind directing plate which regulates the fluid against flowing from the supply port to the discharge port without swirling in the inner space, the wind directing plate being provided on the side wall surface between the discharge port and the supply port by taking, as a reference, a rotation direction in which the fluid supplied to the inner space of the body swirls; and a scupper plate composed of a plate-like member extended on the side wall surface in a vertically downward direction, the scupper plate being provided on the side wall surface between the supply port and the discharge port by taking, as a reference, the rotation direction in which the fluid supplied to the inner space of the body swirls, wherein the discharge port is positionally offset from the supply port in a circumferential direction of the side wall surface in the body, the wind directing plate comprises a plate-like member projecting from the side wall surface into the tubular inner space and is extended on the side wall surface in the vertically downward direction, and wherein the wind directing plate and the scupper plate are composed in such a manner that both of the wind directing plate and the scupper plate are integrally formed by bending both ends of a curved plate-like member curved along the side wall surface of the body, and that the curved plate-like member is fixedly attached onto the side wall surface.

23. The gas/liquid separator according to claim 22, wherein, in the curved plate-like member in which the wind directing plate and the scupper plate are integrally formed, a fixedly attached surface thereof onto the side wall surface is sealed by a liquid gasket.

24. The gas/liquid separator according to claim 22, further comprising:

a projection which introduces the separated gas to the discharge port, the projection projecting from the discharge port toward a center of the inner space of the body.

25. The gas/liquid separator according to claim 22, wherein the curved plate-like member is shaped into a semicircular curve, and the wind directing plate and the scupper plate are bent from opposing ends of the curved plate-like member at substantially opposite positions relative to the sidewall surface.

* * * * *

UNITED STATES PATENT AND TRADEMARK OFFICE
CERTIFICATE OF CORRECTION

PATENT NO. : 8,034,142 B2
APPLICATION NO. : 12/294190
DATED : October 11, 2011
INVENTOR(S) : Akihiro Sakakida et al.

It is certified that error appears in the above-identified patent and that said Letters Patent is hereby corrected as shown below:

At claim 13, column 19, line 15, "provide" should be replaced with "provided".

At claim 21, column 20, line 42, "center-" should be replaced with "center"; and At claim 22, column 20, line 50, "The" should be replaced with "A".

Signed and Sealed this
Twenty-fourth Day of April, 2012

David J. Kappos
*Director of the United States Patent and Trademark Office*